United States Patent

[11] 3,601,960

[72] Inventor Ralph L. Buechler
 16 Oxford Drive, New Albany, Ind. 47150
[21] Appl. No. 27,510
[22] Filed Apr. 13, 1970
[45] Patented Aug. 31, 1971

[54] LAWN MOWER OF THE ROTARY BLADE TYPE
 12 Claims, 12 Drawing Figs.
[52] U.S. Cl. .................................................. 56/320.2,
 56/295
[51] Int. Cl. ........................................................ A01d 55/18
[50] Field of Search ........................................... 56/320.1,
 320.2, 255, 295, 10.5, 13.4, 16.7, 17.5, 13.8

[56] References Cited
UNITED STATES PATENTS

| | | | |
|---|---|---|---|
| 2,734,327 | 2/1956 | Whitney | 56/13.8 |
| 2,969,634 | 1/1961 | Lannert | 56/13.4 |
| 2,973,614 | 3/1961 | Horner et al. | 56/320.2 |
| 3,186,152 | 6/1965 | Epstein | 56/202 |
| 3,413,783 | 12/1968 | Gordon | 56/320.2 |

Primary Examiner—Russell R. Kinsey
Attorney—Arthur F. Robert

ABSTRACT: A lawn mower of the type wherein a blade, which is located in an annular outwardly open blade chamber of a casing having an inwardly open scroll around the blade chamber, is operative, when rotated, to create a main stream of air flowing from a bottom inlet outwardly through the annular chamber and rotationally through the volute chamber. It also creates a similarly flowing supplementary stream, which enters the casing through a top inlet opening concentric to the axis of rotation.

The supplementary stream enables the lawn mower to cut wet grass satisfactorily because it sweeps across the ceiling of the blade chamber and thereby prevents the creation and growth on that ceiling of wet grass deposits which lead to clogging and unsatisfactory operation. Freedom from clogging is also promoted by grass-intercepting gutters on the blade and the use of smooth obstruction-free cornerless surfaces on the blade and on the casing walls.

PATENTED AUG 31 1971 3,601,960

INVENTOR.
RALPH L. BUECHLER

BY Arthur H. Robert

ATTORNEY

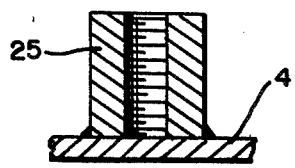
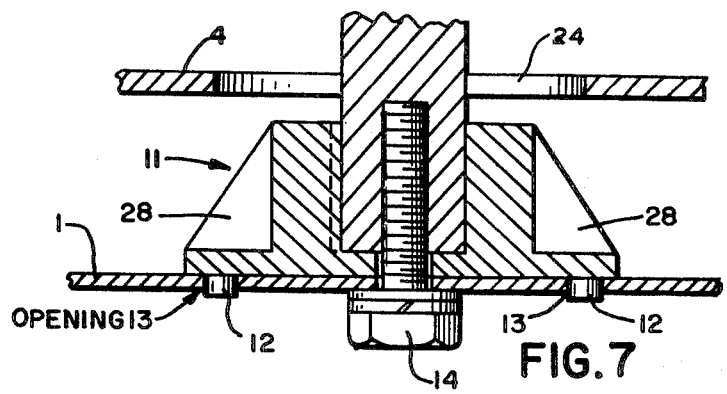
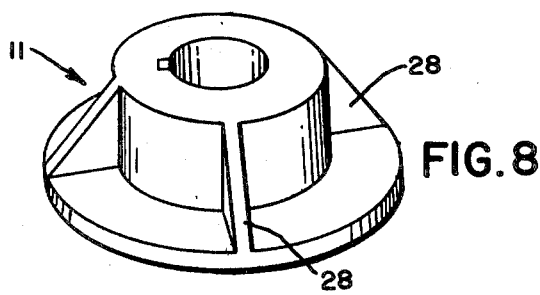
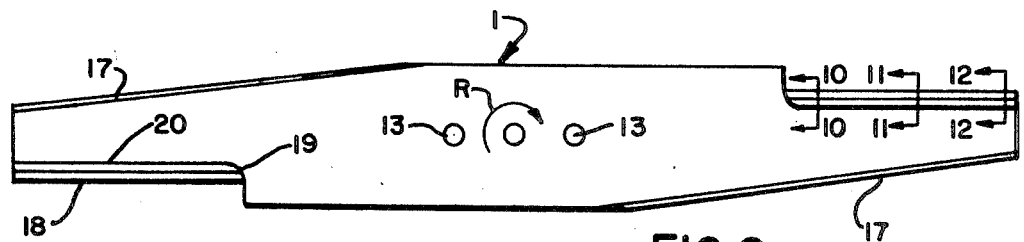
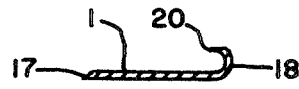
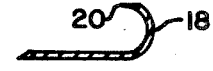
INVENTOR
RALPH L. BUECHLER

LAWN MOWER OF THE ROTARY BLADE TYPE

BACKGROUND OF THE INVENTION

1. Field of the Invention

This invention relates to lawn mowers of the rotary blade type, which function not only to cut grass projecting upwardly through the axially disposed bottom opening of the mower but also to create and maintain a stream of air flowing axially upward through that opening and then radially outward through the annular blade chamber into a surrounding peripherally disposed scroll wherein it flows rotationally through the scroll to a discharge outlet. 2. Description of the Prior Art The 1961 Lannert U.S. Pat. No. 2,969,634 and the 1963 Bonser U.S. Pat. No. 3,093,952 disclose rotary blades provided with grass intercepting gutters. Many patents, including the 1961 Horner et al. U.S. Pat. No. 2,973,614, show blades with upwardly inclined trailing edges or flanges, which inherently produce an updraft fan action. The 1962 Horner U.S. Pat. No. 3,169,358, the 1965 Epstein U.S. Pat. No. 3,186,152, and the 1968 Gordon U.S. Pat. No. 3,413,783 disclose mower casings having an annular blade chamber surrounded by a volute or scroll.

So far as I know, none of these mowers will operate to cut, convey and discharge wet grass satisfactorily and all of them are subject to the creation and growth of wet grass deposits to an extent such that such deposits often drop from the mower in chunks and may clog the mower.

SUMMARY OF THE INVENTION

Objects of the Invention

The principal objects of the invention are: to provide an improved mower of the rotary blade type which will cut wet grass satisfactorily and contemporaneously prevent or substantially minimize the creation and growth of wet grass deposits.

Another important object is to achieve the foregoing objectives without undergoing drastic structural changes from conventional designs.

Statement of the Invention

Most, if not all, of the important objects of my invention may be achieved in a lawn mower of the rotary blade type by providing its blade with a radially extending grass intercepting gutter, the cross-sectional area of which increases progressively outward along its length and by providing a flow of supplementary air radially outward across the ceiling wall of the annular blade chamber. Additionally, the inner end of each gutter is chamfered sufficiently to prevent that end from operating as an obstruction to the outward flow of grass along the blade while the ceiling and scroll walls are smooth-surfaced to eliminate grass catching obstructions. Finally, since my scroll is inwardly but not downwardly open, and since it has a progressively increasing radial depth, a uniform vertical width and an air flow, which remains largely under the impelling influence of the blade, the air flowing through it is compelled to flow uniformly. This prevents it from losing the rotational energy necessary to carry its load of grass.

BRIEF DESCRIPTION OF THE DRAWINGS

The presently preferred embodiment of my invention is illustrated in the accompanying drawings wherein:

FIGS. 6 and 7 are enlarged sectional views of the motor and blade mounting means, respectively taken along lines 6—6 of FIG. 2 and 7—7 of FIG. 1;

FIG. 8 is a perspective view of the blade coupler shown in FIG. 7;

FIG. 9 is an enlarged top plan view of the blade seen in bottom plan in FIG. 1; and FIGS. 10-12 are sectional views respectively taken along lines 10—10, 11—11 and 12—12 of FIG. 9.

DESCRIPTION OF THE PREFERRED EMBODIMENT

Figure 1:
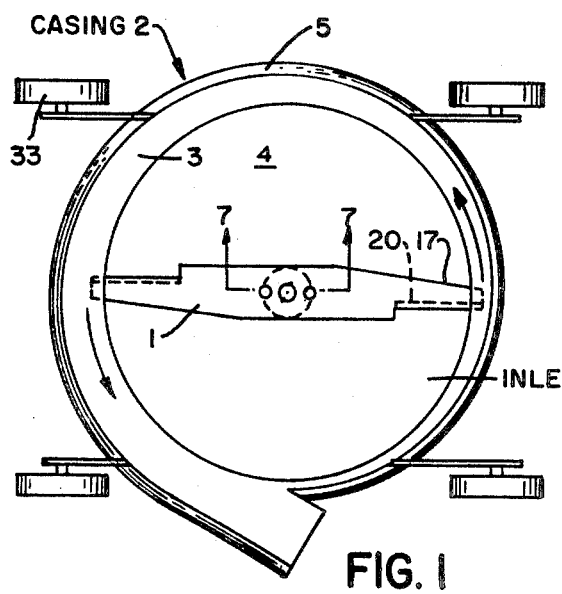
FIGS. 1 and 2 are bottom and top plan views of said embodiment, the top plan view of FIG. 2 omitting the motor and drive shaft.
Figure 2:
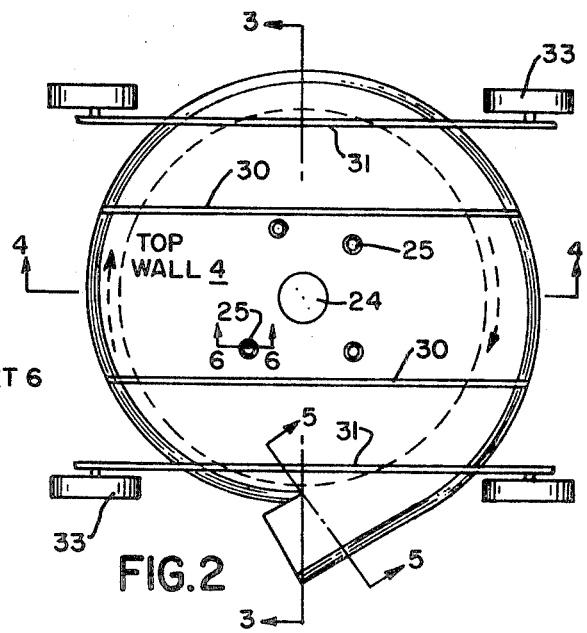
Figure 3:
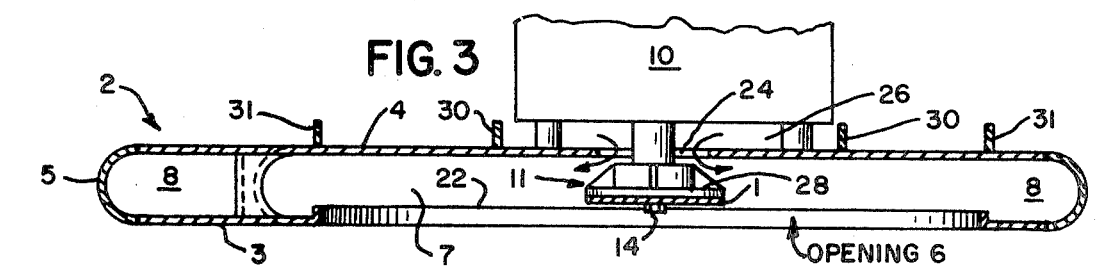
FIGS. 3 and 4 are enlarged vertical sectional views respectively taken along lines 3—3 and 4—4 of FIG. 2, FIG. 3 showing the motorized drive fragmentarily in side elevation and FIG. 4 omitting the drive motor.
Figure 4:
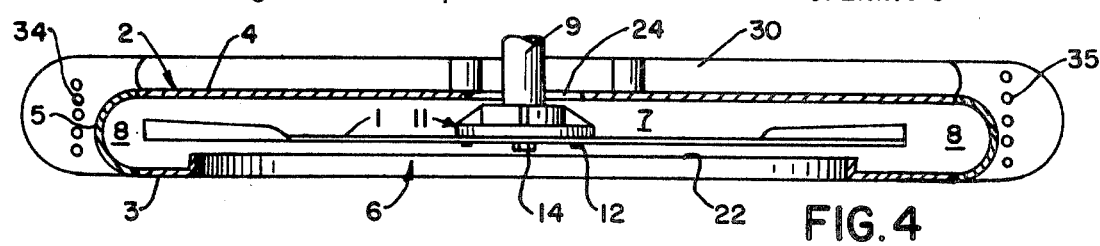
Figure 5:
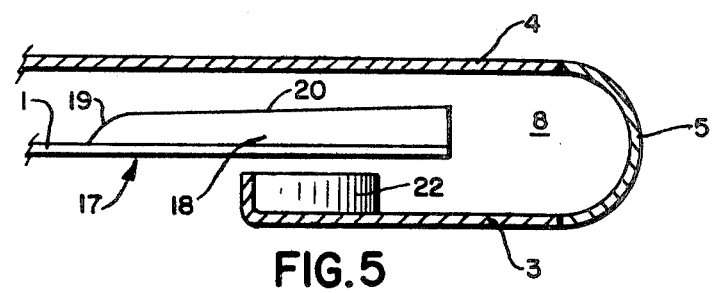
FIG. 5 is an enlarged section taken along line 5—5 of FIG. 2.

In the preferred embodiment shown in the drawings, a rotary blade 1 is housed within a horizontal casing 2 composed of bottom, top and peripheral walls 3, 4 and 5 fashioned to provide an axially disposed inlet opening 6 in the bottom wall 3, an annular rotary-blade chamber 7 between bottom and top walls 3 and 4 and a peripherally disposed outlet passageway 8 along it peripheral wall 5 and between adjacent opposed portions of its bottom and top walls.

The blade 1 is mounted on drive shaft 9 of the drive motor 10 through a coupler 11 in the form of an outwardly flanged axial sleeve, which is axially bored to fit snugly over the lower end of shaft 9 and which is keyed or otherwise conventionally connected to shaft 9. To prevent relative motion between the blade 1 and coupler 11 and to facilitate the mounting and dismounting of the blade on the coupler, the bottom face of the coupler's annular flange is provided with diametrically spaced downwardly extending studs 12 which, when the blade is mounted, project axially through similarly positioned openings 13 in the blade. As seen in FIG. 7, the blade and coupler assembly are retained operatively upon the motor shaft 9 by a securing bolt 14.

Each radial half of the rotary blade 1 has its leading edge 17 sharpened for grass cutting purposes. Each lagging edge portion of blade 1 is bent to curve upwardly and forwardly, in the direction of rotation, to provide a gutter 18 on the upper side of the blade. Each gutter 18 will intercept some of the cut grass, prevent the intercepted grass from flowing upwardly into contact with the inner surface of ceiling of the top wall 4 and direct such grass to flow radially outward, under the influence of both centrifugal force and the adjacent outwardly flowing air, and ultimately pass into the peripherally disposed outlet passageway 8.

As seen in FIGS. 10-12, the cross-sectional area of each gutter 18 is progressively increased radially outward to accommodate progressively greater quantities of intercepted grass along its length and to prevent grass in the gutter from clogging the gutter. The inner end-surface 19 of each gutter is chamfered to extend obliquely outward to prevent that end from operating as a grass catching obstruction. The free radial edge 20 of the gutter preferably is sharpened for grass cutting purposes.

The bottom wall 3 of the casing is in the form of a metal disc fashioned to form the circular inlet opening 6 and to provide that opening with an upwardly extending annular flange 22. The outer or peripheral edge of the bottom wall 3 is cut, over the volute angle, to conform to the volute curvature of the corresponding edge of the peripheral wall 5; hence, the radius of the outer edge of the bottom wall 3 will increase progressively over the volute angle, which may be of any desired size but is assumed to approximate 330°. The remaining outer edge portion of the bottom wall, which lies outside the volute angle, extends tangentially outward to conform to the tangentially directed discharge portion of the outlet passageway 8 of the casing 2.

The top wall 4 has an outer peripheral edge or periphery which conforms identically in size and shape to the convolute and tangential portions of the periphery of the bottom wall 3. This wall should be smooth and obstruction-free as shown. It preferably is flat but it may slant annularly upward to a slight extent. It should not slant annularly downward toward the periphery.

In accordance with a particular feature of my invention, the top wall 4 is provided around the axis of blade rotational with an axial air inlet opening 24 preferably concentric to the axis of rotation but of small diameter relative of the diameter of the bottom axial inlet opening 6 while the drive motor 10, which overlies the top wall 4, is mounted thereon through internally threaded spacers 25 to provide an annular air supply passageway 26 for the air inlet opening 24. The spacers 25 are welded or otherwise suitably secured to the top wall 4 and internally threaded to receive bolts mounting the motor 10 to the spacers 25. The top air inlet 24 places the suction area of the interior of the casing 2 in communication with the outside atmosphere through the annular space 26 between top wall 4 and motor 10.

With this arrangement, when the blade 1 is rotated, a supplementary stream of air will flow from the outside atmosphere inwardly through the annular space 26, thence downwardly into the casing 2 through inlet 24 from which it flows outwardly along and across the ceiling of the casing 2 and into the volute outlet passageway 8. This flow of supplemental air may be increased by providing the coupler 11 with radial fan blades 28. These blades 28 also function to effect a mechanical strengthening of the coupler 11.

The peripheral wall 5 comprises a suitable horizontal length of split round pipe, which has a cross section of semicircular curvature and which is convolutely and tangentially bent horizontally along its length to conform its long lower and upper edges (on its open or inner side) to the convolute and tangential portions of the peripheries of the casing's bottom and top walls 3 and 4.

The top wall 4 may be strengthened by providing it with a pair of reinforcing forward-rearward ribs 30 arranged on either side of a vertical plane passing centrally through the mower from front to rear. Likewise, the top walls 4 may be additionally strengthened and the peripheral wall 5 reinforced at the same time by a pair of longer front-rear ribs 31, the ends of each of these longer ribs being widened in the downward direction to embrace the vertical width of the peripheral wall 5 and curved to conform to the outer vertical curvature of that wall. The shorter ribs 30 may be welded or otherwise secured to the top wall. The longer ribs 31 may be welded or otherwise secured to both top wall 4 and peripheral wall 5.

The mower is suitably mounted on transportation wheels 33. As shown, the wheels 33 are conveniently mounted on the front and rear end portions of the longer ribs 31. Accordingly, these end portions are provided with a vertical series of wheel-mounting front holes 34 and rear holes 35 to enable the ground clearance of the mower to be adjusted as desired. Each hole 34 of the front series may be offset vertically from the horizontal plane of the corresponding rear hole 35 in order to provide greater or lesser front ground clearance of the casing relative to the rear clearance thereof whenever desired.

The casing 2 may be fabricated in other ways. As a matter of fact, it may be easier and cheaper to make a sturdy and rugged casing by the conventional casting process. However fabricated, I prefer to have the blade located above the lowermost horizontal plane of the bottom inlet opening 6 and therefore more or less enclosed within the casing 2. I also prefer a blade, which is longer than the diameter of opening 6. In such case, the housing protects the blade against damage and reduces the possibility of a blade converting stationary rocks on the ground into flying missiles because all potential blade obstructions must pass through the inlet opening in order to engage the blade and will normally engage the casing before they can engage the blade. The tangential discharge portion of the volute passageway 8 may be horizontally level as shown or slightly inclined.

In operation, my mower, like most conventional mowers of the rotary blade type, operates satisfactorily to cut short and long dry grass and to convey such cuttings to and discharge them from the mower outlet. So far as I know, conventional mowers do not operate to cut, convey and discharge wet grass with consistent satisfaction. In this connection, I have used my mower to cut wet grass (ranging from short to tall) and have consistently obtained very satisfactory results including freedom from clogging, freedom from the creation and growth of wet grass deposits on the blade and the housing, at least to an extent such that wet grass chunks of objectionable size are discharged through the outlet passageway 8 or may drop downwardly through inlet opening 6.

While I cannot specify, with certainty, the features responsible for the ability of my mower to cut wet grass with consistent satisfaction, with respect to the blade, I believe: that the chamfer, at the inner end of the gutter, prevents wet grass from catching on the inner end of the gutter and building up a deposit; that the gutter itself intercepts a substantial quantity of the cuttings and successfully directs them outwardly into the volute passageway; and that the progressively increasing area of the gutter prevents the intercepted grass cuttings from clogging the gutter.

With respect to the casing, I believe: that the smooth surfaces of those casing walls, which provide the ceiling of the annular chamber and which form the volute outlet passageway, do not have any obstruction on which the grass can catch and thereby form a growing deposit; that the supplementary air, which flows outwardly across the smooth-surfaced ceiling, either intercepts grass moving toward the ceiling and compels the intercepted grass to flow outwardly into the volute passageway, or permits cut grass to reach that surface and then operates to move such grass along that surface with sufficient efficiency to prevent any appreciable amount of grass remaining thereon; and that, by providing a smooth-walled inwardly open volute which is substantially free of air flow obstructions and by minimizing the open space in the volute between the radial edges of the blade and the adjacent bottom and top walls of the casing, turbulence is minimized while smooth and efficient flow conditions are maximized.

As a result, a substantial portion of the available energy of the rotating blade is used to force all of the air and grass to flow entirely through the volute passageway and contemporaneously sweep the volute passageway clean whereby the creation and growth of wet grass deposits therein is prevented. If, through turbulence or any other cause, any air in the lower horizontal part of the volute passageway tends to flow inwardly toward the central opening 6, such air flow will either be reduced (or redirected into the main outward flow) by the rim 22 on opening 6.

Having described my invention, I claim:

1. A lawn mower of the type wherein a high speed blade rotates horizontally about a vertical axis, comprising:
   A. a wheeled casing having
      1. a pair of horizontal bottom and top casing walls vertically spaced to provide therebetween an annularly extending outwardly open blade chamber concentric to said axis, and
      2. a horizontal peripheral wall, having a circumferential contour of volute shape and a semicircular curvature in vertical cross section, bridging the space between the peripheries of the bottom and top walls and cooperating therewith to provide the bottom, top and peripheral walls of an inwardly open volute chamber having
         a. a radial communication with said outwardly open blade chamber,
         b. a substantially uniform vertical width between said top and bottom wall portions of said volute chamber,
         c. a progressively increasing radial depth, and
         d. a tangential discharge, and
      3. means forming casing inlet openings concentric to said vertical axis, including
         a. one opening in said bottom wall, and
         b. a supplementary opening in said top wall; and
   B. a blade located in said annular chamber, mounted to said casing for rotation about said axis, and operative, when rotated, to create two streams of air flowing outwardly through said annular chamber and rotationally through said volute chamber, and including
      1. a main stream from said bottom inlet, and 2. a ceiling stream from said top inlet.

2. The mower of claim 1 wherein:
A. said top wall provides said annular blade chamber with a substantially smooth obstruction-free ceiling, across which said ceiling stream flows annularly outward.

3. The mower of claim 2 wherein:
A. the surface of said ceiling is substantially flat.

4. The mower of claim 1 including:
A. means carried by the casing and cooperating with said top wall to provide an inlet air space over the top wall,
   1. said space accommodating the flow of ceiling-stream air from the ambient atmosphere inwardly to said supplementary opening.

5. The lawn mower of claim 1 wherein:
A. said supplementary opening is concentric to said vertical rotational axis;
B. a drive shaft extends downwardly through said supplementary opening and rotates on said axis to drive said blade; and
C. a fan, located above said blade, is mounted on said drive shaft to facilitate the flow of said ceiling stream.

6. The lawn mower of claim 5 wherein:
A. said blade mounting means includes
   1. a coupler in the form of an outwardly flanged sleeve axially bored to fit over the lower end of said shaft and keyed thereto for rotation therewith, and
   2. said fan is mounted on said coupler.

7. The lawn mower of claim 1 wherein:
A. said blade has a pair of radially extending lead and lag edges on each side of its center,
   1. each lead edge being sharpened for grass cutting purposes, and
   2. each outer lag edge portion being bent to curve upwardly and forwardly, in the direction of rotation, to provide a grass-intercepting gutter on the upper side of the blade.

8. The lawn mower of claim 7 wherein:
A. the cross-sectional area of said gutter progressively increases in a direction proceeding radially outward.

9. The lawn mower of claim 7 wherein:
A. the inner end portion of each gutter is chamfered to extend obliquely outward.

10. The lawn mower of claim 7 wherein:
A. the radially extending lead edge of each gutter is sharpened for grass cutting purposes.

11. An improved blade, for lawn mowers of the type wherein a high speed rotates horizontally about a vertical axis, comprising:
A. a blade-forming body having a rotational center and radially extending lead and lag edges on each side of said center,
   1. each lead edge being sharpened for grass cutting purposes, and
   2. an outer portion of each lag edge being bent upwardly and forwardly, in the direction of rotation, to provide a grass-intercepting gutter on the top side of the blade,
      a. the cross-sectional area of said gutter increasing progressively outward.

12. The blade of claim 11 wherein:
A. the inner end portion of each gutter is chamfered to extend obliquely outward from center; and
B. the radially extending lead edge of each gutter is sharpened for grass cutting purposes.